United States Patent [19]

Nakao et al.

[11] Patent Number: 4,580,146
[45] Date of Patent: Apr. 1, 1986

[54] INFORMATION RECORDING MATERIAL

[75] Inventors: Masafumi Nakao; Isao Morimoto; Koichi Mori, all of Fuji, Japan

[73] Assignee: Asahi Kasei Kogyo Kabushiki Kaisha, Osaka, Japan

[21] Appl. No.: 510,763

[22] Filed: Jul. 5, 1983

[30] Foreign Application Priority Data

Jul. 9, 1982 [JP] Japan .................. 57-118498

[51] Int. Cl.4 ............................. G01D 15/10
[52] U.S. Cl. ................. 346/135.1; 346/76 L; 369/284; 430/945
[58] Field of Search .............. 346/135.1, 76 L; 369/284, 288; 430/945, 348

[56] References Cited

U.S. PATENT DOCUMENTS

| 3,560,994 | 2/1971 | Wolff | 346/135.1 |
| 4,188,214 | 2/1980 | Kido et al. | 346/135.1 X |
| 4,296,419 | 10/1981 | Terao | 346/135.1 |
| 4,317,123 | 2/1982 | Namiki et al. | 346/135.1 |
| 4,335,198 | 6/1982 | Hanada et al. | 346/135.1 X |
| 4,357,616 | 11/1982 | Terao | 346/135.1 |
| 4,461,807 | 7/1984 | Mori | 346/135.1 X |
| 4,531,183 | 7/1985 | Morimoto | 346/135.1 |

Primary Examiner—Joseph W. Hartary
Attorney, Agent, or Firm—Birch, Stewart, Kolasch & Birch

[57] ABSTRACT

An information recording material comprising a substrate, a metallic recording layer composed mainly of Bi and a Cr layer interposed therebetween has been found to be extremely excellent in C/N ratio as well as in storage stability and archivability. The information recording material of this type can be advantageously employed for video image signal memory, still video recording, and the like.

11 Claims, 10 Drawing Figures

INFORMATION RECORDING MATERIAL

BACKGROUND OF THE INVENTION

The present invention relates to an information recording material suitable for use in an optical disk system. More particularly, the present invention is concerned with an information recording material which is excellent in carrier-to-noise ratio, storage stability and archivability.

Information storage systems in which information is stored by selective ablation, evaporation, removal or modification of a recording medium irradiated spotwise with a focused laser beam or the like having high density or strong energy are known as the so-called heat mode recording process to those skilled in the art. The heat mode recording process is a dry process which does not any treatment with chemicals or other treating solutions and in which a real-time recording can be made. According to this process, information can be quickly recorded in a high contrast form with a large capacity in respect to the amount of information recordable per unit area of the recording medium, and additional information can be recorded later. Due to such advantages, the heat mode recording process has a wide variety of applications in the field where a micro-image recording medium, a computer-output microfilm, a video disk, a computer signal memory medium or the like is involved.

The heat mode recording medium which is used particularly as the video disk, the document filing and the computer signal memory medium generally comprises an information recording layer formed on a suitable substrate such as a circular plate or disk of glass or a synthetic resin. When a laser beam modulated (frequency: several hundreds KHz to several tens MHz) is focused on the recording layer rotated at a high speed, pits (holes) of 1.5μ or less in width are formed in the areas where the recording layer is irradiated with the laser beam, whereby information is recorded in the recording medium. The positions and sizes of the formed pits depend on the output wave form of laser beam modulated and correspond to the input information. The readout of the information stored in the recording medium is carried out by applying to the recording medium being rotated at a high speed a focused weak laser beam whose intensity is lower than the threshold value to produce a pit in the recording layer, and electrically detecting the variation of the reflected light by means of a photoelectric transducer, followed by demodulation of the obtained signals by means of a decoder.

As a recording material to be used in the above-mentioned heat-mode recording process, various materials have hitherto been proposed. However, none of them are satisfactory with respect to sensitivity, carrier-to-noise ratio, (hereinafter referred to as "C/N ratio") storage stability, archivability and the like.

The present inventors have previously conducted extensive research with a view to eliminating the drawbacks accompanying the conventional heat mode recording materials and succeeded in attaining improvements to some extent both in sensitivity and C/N ratio by providing at least one mixture layer of a metallic compound and a metal on at least one side of the metallic recording layer (see European patent application Publication No. 0045183). The recording material of the structure as mentioned just above exhibits an excellent sensitivity as well as a relatively high C/N ratio especially when recording is effected by applying a laser beam through a transparent substrate. In the case where recording is effected by semiconductor laser beam irradiation, it is required that the recording material to be employed have a high C/N ratio and a high sensitivity. In this respect, the information recording material of the type as mentioned above which is relatively excellent in both C/N ratio and sensitivity can advantageously be employed in recording by means of a semiconductor laser. Generally, in the digital recording system utilized for data or document filing, a recording medium or a material to be used in such system is required to have a C/N ratio of 40 dB or more. When recording by means of a semiconductor laser beam is effected using the recording material disclosed in the above-mentioned European patent application Publication No. 0045183, it is possible to obtain a C/N ratio as high as approximately 47 dB at a standard information recording frequency of 1 MHz (pulse width: about 500 nsec). As is apparant from the above, the above-mentioned recording material which has at least one mixture layer of a metallic compound and a metal on at least one side of the metallic recording layer can perform a digital recording by means of a semiconductor laser beam effectively, and, therefore, is excellent from a practical viewpoint.

However, in the case of video image signal memory or still video recording where a pulse-width modulation system or the like is employed for the information recording and for the readout of the recorded information, the use of a recording material which can exhibit a C/N ratio higher than 47 dB is required. As a recording material having a C/N ratio higher than 47 dB, a recording material comprising a thin film of a chalcogen compound or that comprising a thin film of a suboxide of Te or the like have hitherto been proposed. However, such recording materials are still insufficient for satisfying the demand for a recording material not only excellent in recording characteristics but also in storage stability and archivability.

Accordingly, under such circumstances, there is a strong demand in the art to develop a recording material which is not only excellent in recording characteristics but also in storage stability and archivability.

SUMMARY OF THE INVENTION

As a result of investigations, the present inventors found that the reason for the fact that the information recording material disclosed in the above-mentioned European patent application Publication No. 0045183 is incapable of attaining a C/N ratio higher than 47 dB resides in that, in the case of such information recording material, the noise level after recording may unfavorably be increased by approximately 10 dB as compared with that before recording. Accordingly, with a view to minimizing such increase in noise level as observed in the recording material as disclosed in European patent application Publication No. 0045183, the present inventors conducted still further research. As a result, the present inventors have unexpectedly found that such increase in noise level after information recording can be effectively suppressed by employing as the metallic recording layer a film composed mainly of Bi, and, at the same time, by providing between the substrate and the metallic recording layer a layer of Cr, and, further, that an information recording material comprising a substrate having superimposed on the substrate in the following order, a Cr layer, a metallic recording layer composed mainly of Bi; and a stabilizing layer of a metallic compound has not only a high C/N ratio but also has excellent storage stability and archivability. The present invention has been made based upon such novel findings.

It is, therefore, an object of the present invention to provide an information recording material which is excellent in C/N ratio, storage stability and archivability.

BRIEF DESCRIPTION OF THE DRAWINGS

The foregoing and other objects, features and advantages of the present invention will be apparent to those skilled in the art from the following detailed description and appended claims taken in connection with the accompanying drawings in which:

DETAILED DESCRIPTION

Figure 1A:
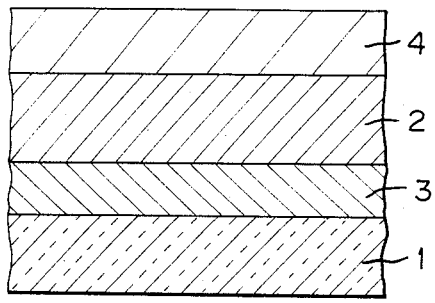
FIG. 1(a) is a cross-sectional view of one form of an information recording material according to the present invention.
Figure 1B:
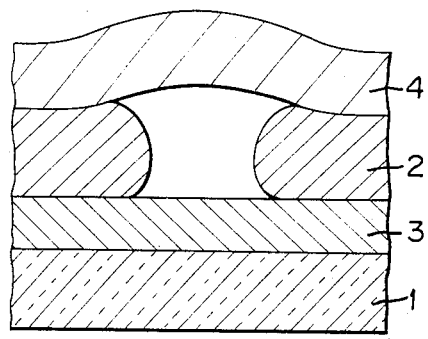
FIG. 1(b) is a cross-sectional view of the information recording material shown in FIG. 1(a) having a pit formed by laser beam irradiation.
Figure 2A:
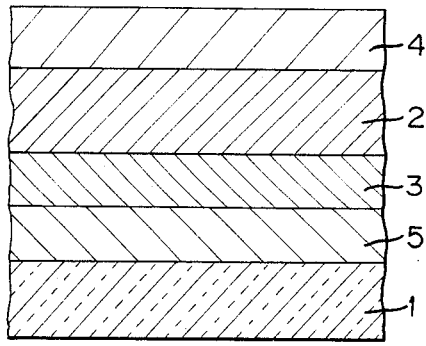
FIG. 2(a) is a cross-sectional view of another form of an information recording material according to the present invention.
Figure 2B:
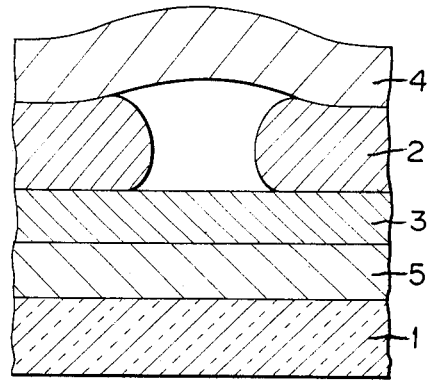
FIG. 2(b) is a cross-sectional view of the information recording material shown in FIG. 2(a) having a pit formed by laser beam irradiation.
Figure 3A:
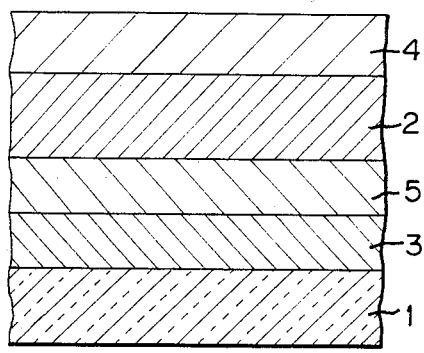
FIG. 3(a) is a cross-sectional view of still another form of an information recording material according to the present invention.
Figure 3B:
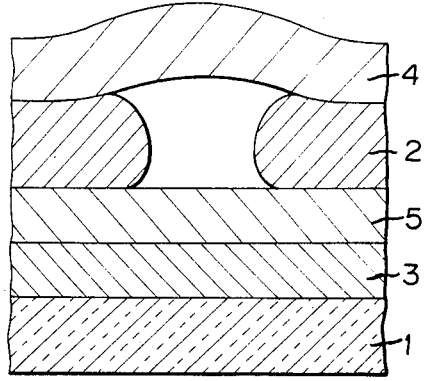
FIG. 3(b) is a cross-sectional view of the information recording material shown in FIG. 3(a) having a pit formed by laser beam irradiation.
Figure 4A:
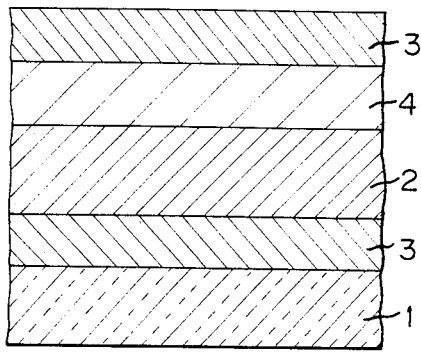
FIG. 4(a) is a cross-sectional view of a further form of an information recording material according to the present invention.
Figure 4B:
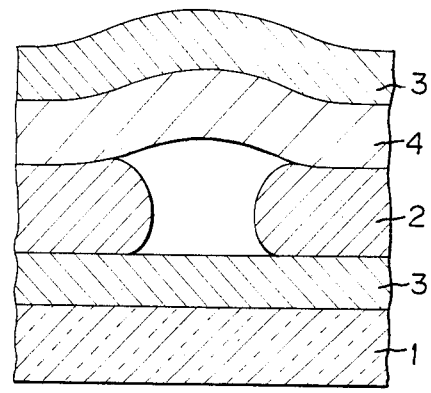
FIG. 4(b) is a cross-sectional view of the information recording material shown in FIG. 4(a) having a pit formed by laser beam irradiation.
Figure 5A:
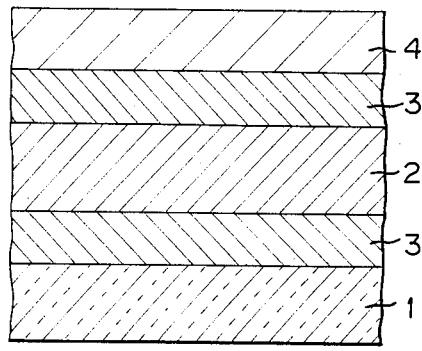
FIG. 5(a) is a cross-sectional view of a still further form of an information recording material according to the present invention.
Figure 5B:
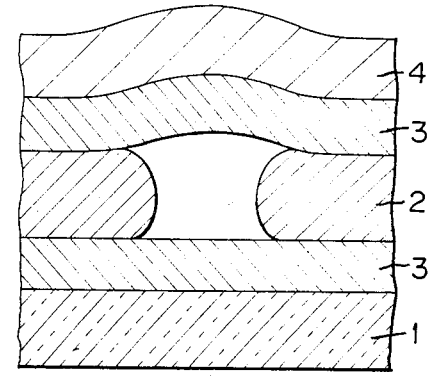
FIG. 5(b) is a cross-sectional view of the information recording material shown in FIG. 5(a) having a pit formed by laser beam irradiation.

In FIGS. 1 to 5, like portions are designated by like numerals.

According to the present invention, there is provided an information recording material comprising a substrate having superimposed thereon in the following order, a first Cr layer, a metallic recording layer composed mainly of Bi, and a stabilizing layer of a first metallic compound.

According to the present invention, the combined provision of a film composed mainly of Bi as the metallic recording layer and a film of Cr as the layer interposed between the substrate and the metallic recording layer is of crucial importance. The provision of a Cr layer (hereinafter referred to as "first Cr layer") between the substrate and the metallic recording layer composed mainly of Bi contributes to a remarkable improvement in C/N ratio of the resulting information recording material.

Generally, it is considered that a poor result in respect of C/N ratio is attributable to the following two reasons: (1) irregularities or disorders in shape or profile of pits formed in the recording layer of the information recording material upon the laser beam irradiation; and (2) differences in information readout light beam reflectivity among the pits formed in the recording layer of the information recording material.

Although the theoretical analysis of the pit-forming mechanism of heat mode recording media has not been fully made as yet, (1) viscosity of the metal of the metallic recording layer when molten, (2) surface tension of the metal when molten and dispersed, (3) physical rigidity of layers adjacent to the metallic recording layer, which rigidity affects the metal melting and deforming performances, (4) heat scattering towards the surroundings affecting the solidification of the molten metal, (5) size and oxidation degree of metal grains, and (6) size of metal grains present at the edge portions of the formed pits, etc. are believed to be factors affecting the shape of pits formed upon irradiation by a laser beam. In view of those factors, the reasons for the fact that the provision of a first Cr layer between the substrate and the metallic recording layer composed mainly of Bi contributes to suppression of the increase in noise level are believed to be as follows: (1) Cr undergoes partial oxidation and is brought into a passive state during the course of formation of a Cr layer, thereby forming a Cr film having a stable, dense and smooth surface; and (2) the thermal conductivity of Cr is higher than that of the material to be used as the substrate. With respect to the reason as set forth under the item (1), a more detailed explanation will be made as follows. When the metallic recording layer composed mainly of Bi is directly formed on the substrate without a Cr layer interposed therebetween, the grain boundaries of the metallic recording layer unfavorably undergo oxidation due to the invasion of oxidizing materials such as water, oxygen or the like through the substrate, thereby causing pits having irregularities or disorders in shape to be formed in the recording layer upon selective ablation by a laser beam. Such unfavorable oxidation of the grain boundaries of the metallic recording layer can be eliminated by providing a first Cr layer between the substrate and the metallic recording layer. This is so because, as mentioned above, Cr is partially oxidized and brought into a passive state during the course of film formation and, hence, the resulting Cr layer can exert a shielding effect on the metallic recording layer, thereby preventing the grain boundaries of the recording layer from undergoing unfavorable oxidation. In addition, due to the formation of a dense, smooth Cr film between the substrate and the metallic recording layer, melting and dispersion of the metal upon irradiation of a laser beam can be effected promptly, whereby pits with shapes free from irregularities or disorders can be formed in the metallic recording layer.

With respect to the reason as set forth under the item (2), an explanation will be made as follows.

Since the thermal conductivity of Cr is higher than that of a material to be used as the substrate, e.g. glass, polymethyl methacrylate or the like, the metallic recording layer provided on the substrate with a first Cr layer interposed therebetween can be rapidly cooled during the course of solidification of the molten metal, due to scattering of a great amount of heat from the metal at its portion irradiated with the focused laser beam. Such rapid cooling of the molten metal during the course of solidification leads to formation of minute crystals at the edge portions of the formed pits, and, as a result, the pits have smooth edge lines.

Besides the reasons as mentioned above, the factors with respect to the pit-forming mechanism mentioned in (1) to (6) above are believed to be favorably affected by the combined provision of a Bi-composed metallic recording layer and a first Cr layer to produce synergistically a surprising effect as to the suppression of an increase in noise level.

According to the present invention, a stabilizing layer of a metallic compound (hereinafter referred to as "first metallic compound") is provided on the metallic recording layer. The stabilizing layer of a first metallic compound serves to improve the stability of the metallic recording layer against deterioration by oxidation and the like, as will be specifically explained later.

The information recording material of the present invention with the structure as mentioned above is extremely excellent in C/N ratio as well as in storage stability and archivability.

In the meantime, it is generally known that the sensitivity of an information recording material can be increased by reducing the reflectivity of the side of the recording material from which side the irradiation with a focused laser beam is effected.

In order to reduce the reflectivity of the recording material, there have hitherto been proposed provision of a layer of materials such as inorganic or organic transparent substances, organic dyes or sulfides at a position adjacent to the metallic recording layer. However, if use is made of the inorganic or organic transparent substances for the reflection preventing purpose, such a problem may arise that since the layer of such transparent substances must be provided at a position adjacent to the recording layer with a thickness as large as 1000 Å or more, heat scattering from the recording layer towards such layer is so great that the desirable effects on the reduction in reflectivity cannot be attained even though a laser beam can be absorbed into the recording layer sufficiently.

Further, in the case where recording is effected by laser beam irradiation through a transparent substrate, e.g. a plate of glass or polymethyl methacrylate, an effective reduction in reflectivity cannot be attained by the use of such inorganic or organic transparent substances for reflection preventing purpose. This is so because there is no appreciable difference in refractive index between the transparent substrate and such inorganic or organic transparent substances, which difference is required to be great in order to attain a sufficient reduction in reflectivity.

On the other hand, the use of organic dyes or sulfides for the reflection preventing purpose brings about a successful reduction in reflectivity without problems such as mentioned above. However, organic dyes are known to be sensitive to ultraviolet light or the like, and, therefore, easily undergo decolorization. With respect to the use of nitrides, there is such a problem that some adverse effects might be exerted on the properties of the recording material due to their hygroscopic nature and tendency to undergo thermal dissociation at the time of information recording. As is apparent from the above, any of the above-mentioned materials used for the reflection preventing purpose is unsatisfactory from a practical viewpoint.

According to the present invention, in the case where recording is effected by laser beam irradiation through a substrate (in this case, the substrate must be transparent), the reflectivity of the recording material can be sufficiently reduced by further providing a layer of a metallic compound (hereinafter referred to as "layer of a second metallic compound") between the substrate and the first Cr layer or between the first Cr layer and the metallic recording layer.

On the other hand, in the case where the information recording is effected by laser beam irradiation from the side remote from the substrate, the reflectivity of the recording material can be sufficiently reduced by providing, in addition to the first Cr layer provided between the substrate and the metallic recording layer, another Cr layer (hereinafter referred to as "second Cr layer") between the metallic recording layer and the stabilizing layer of a first metallic compound or on the side of the stabilizing layer of a first metallic compound remote from the substrate.

The present invention will be explained in more detail with reference to the drawings.

Referring now to FIG. 1, there is shown one form of an information recording material of the present invention which comprises a substrate 1 having superimposed thereon in the following order, a first Cr layer 3, a metallic recording layer 2 and a stabilizing layer 4 of a first metallic compound. In this recording material, recording may be effected by laser beam irradiation through either the substrate or the stabilizing layer of a first metallic compound.

FIG. 2 shows a cross-sectional view of another form of an information recording material of the present invention. This information recording material comprises a substrate 1 having superimposed thereon in the following order, a layer of a second metallic compound 5, a first Cr layer 3, a metallic recording layer 2 and a stabilizing layer 4 of a first metallic compound.

FIG. 3 shows a cross-sectional view of still another form of an information recording material of the present invention. This information recording material comprises a substrate 1 having superimposed thereon in the following order, a first Cr layer 3, a layer of a second metallic compound 5, a metallic recording layer 2 and a stabilizing layer 4 of a first metallic compound. In the case of the recording material as shown in FIGS. 2 to 3, recording may preferably be effected by laser beam irradiation through the substrate 1. When recording is effected by laser beam irradiation through the stabilizing layer, a remarkable improvement in sensitivity cannot be attained as compared with the case where recording is effected by laser beam irradiation through the substrate.

FIG. 4 shows a cross-sectional view of a further form of an information recording material of the present invention. This information recording material comprises a substrate 1 having superimposed thereon in the following order, a first Cr layer 3, a metallic recording layer 2, a stabilizing layer 4 of a first metallic compound and a second Cr layer 3.

FIG. 5 shows a cross-sectional view of a still further form of an information recording material of the present invention. This information recording material comprises a substrate 1 having superimposed thereon in the following order, a first Cr layer 3, a metallic recording layer 2, a second Cr layer 3 and a stabilizing layer 4 of a first metallic compound. In the case of the recording material as shown in FIGS. 4 and 5, recording may preferably be effected by laser beam irradiation from the side remote from the substrate. When recording is effected by laser beam irradiation through the substrate, a remarkable improvement in sensitivity cannot be attained as compared with the case where recording is effected by laser beam irradiation from the side remote from the substrate.

FIGS. 1(b), 2(b), 3(b), 4(b) and 5(b) illustrate the recording materials having pits 6 respectively formed by irradiating the recording materials shown in FIGS. 1(a), 2(a), 3(a), 4(a), and 5(a) with a laser beam.

With respect to the substrate used as a support for the information recording material, it is to be noted that transparency is required of the substrate, in case the ablation of the metallic recording layer by laser beam irradiation from the side of the substrate is intended. In general, it is known that the transparency of substances varies depending on the wavelength or frequency of incident light. When information is recorded on the recording material of the present invention, various light sources having different optical characteristics may be used. Such light sources include semiconductor laser, argon gas laser and other lasers having an oscillation wavelength of the visible region or near-infrared region. In the information recording material of the present invention, it is preferred that a substrate having transparency matched with the optical characteristics of the light source used be employed from a viewpoint of a further improvement of sensitivity. In the present information recording material, a material having a light transmittance of about 90% or more to incident light may preferably be used as the substrate when the information material is irradiated with a light beam from the side of the substrate.

Substrates having a sufficient light transmittance to the light emitted from any of the above-mentioned light sources include films and plates of inorganic materials such as glass; and those of organic materials, for example, polymers such as polyester, polypropyrene, polycarbonate, polyvinyl chloride, polyamides, polystyrene and polymethyl methacrylate and modified polymers derived therefrom, copolymers of monomer units of the above polymers and blends thereof. Of such materials of the substrate, especially preferred are films and plates of polyesters or of polymethyl methacrylate. When the smoothness of the surface of the substrate itself has a great influence on the C/N ratio of an information recording material as in the case of a video disk or the like, there may preferably be employed a substrate obtained by coating a separately prepared film or plate with one of the above-mentioned materials, for example, by the spin coating technique.

In the information recording material of the present invention, as is illustrated in FIG. 1, a first Cr layer 3 is provided between the substrate 1 and the metallic recording layer 2. As mentioned above, the presence of the first Cr layer between the substrate and the metallic recording layer greatly contributes to an improvement in C/N ratio.

The thickness of the first Cr layer may be within the range of 10 to 200 Å, more preferably 30 to 80 Å. If the thickness of the first Cr layer is smaller than 10 Å, a sufficient improvement in C/N ratio cannot be attained. On the other hand, if the thickness of the first Cr layer is greater than 200 Å, the resulting information recording material has a poor sensitivity. This is so because the presence of such a thick Cr layer may disturb the light transmission to the metallic recording layer.

As illustrated in FIGS. 2 and 3, according to the present invention, in the case where recording is effected by laser beam radiation through the substrate, a layer 5 of a second metallic compound may be provided between the substrate 1 and the first Cr layer 3 or between the first Cr layer 3 and the metallic recording layer 2 so that a further improvement in sensitivity is attained.

As the metallic compound to be used for the layer 5 of a second metallic compound, there can be mentioned oxides, nitrides and fluorides of Be, Li, B, Mg, Al, Si, Ca, Sc, Ti, V, Cr, Mn, Fe, Co, Ni, Cu, Zn, Ga, Ge, As, Sr, Y, Zr, Nb, Tc, Ru, Rh, Ag, In, Sn, Sb, Ba, La, Hf, Ta, Re, Ir, Tl, Pb, Bi, Ce, Dy, Er, Gd, Nd, Pr, Sm, Pm, Eu, Tb, Ho, Tm, Yb and Lu. Among them, oxides of rare earth elements such as Lu, Y, La, Ce, Pr, Nd, Pm, Sm, Eu, Gd, Tb, Dy, Ho, Er, Tm and Yb are preferred from a view point of reflection preventing performance. Especially preferred are oxides of rare earth elements such as Y, La, Ce, Pr, Nd, Sm, Gd, Dy and Er.

The reason for the fact that the use of the above-mentioned oxides of the rare earth elements as the material for the layer of a second metallic compound is especially preferred from a viewpoint of an effective prevention of reflectivity has not yet been elucidated. However, it is believed that during the course of preparation of a recording material, a partial oxidation of Cr and a partial reduction of the oxide of a rare earth element are simultaneously caused to occur, thereby enabling the resulting laminate to have such a high refractive index as will attain a sufficient reduction in reflectivity. In this connection, the complex index of refraction with respect to this laminate is represented by the formula:

$$\overline{n} = n - iK$$

wherein
$\overline{n}$ represents the complex index of refraction;
n the refractive index;
K the extinction coefficient; and
i the imaginary quantity Further advantages arising from the use of oxides of the above-mentioned rare earth elements is as follows. Since the oxides of the above-mentioned rare earth elements have excellent thermal stabilities and hardly undergo deterioration, when a film of such an oxide is provided in combination with the stable film of Cr to form a laminate, the resulting laminate has a remarkably excellent stability. Further, it should be noted that the laminate consisting of a film of Cr and a film of an oxide of the above-mentioned rare earth elements can exhibit a remarkable stability to a light having strong energy and a short wavelength, e.g. an ultra-violet light.

The above-mentioned second metallic compounds may be used either alone or in combination. When two or more kinds of second metallic compounds are employed in combination, the resulting layer may be either of a multi-layer structure of respective layers of different metallic compounds or of a single layer structure of a mixture of two or more kinds of metallic compounds.

The thickness of the above-mentioned layer of a second metallic compound may be varied depending on the kind of a metallic compound used. However, if the layer of a second metallic compound is too thick, cracks are apt to occur in this layer. On the other hand, if the thickness of such layer is too small, the desirable effects as to the reduction in reflectivity cannot be attained. Therefore, it is preferred that the thickness of the layer of a second metallic compound be 10 to 300 Å, more preferably 30 to 200 Å.

According to the present invention, by varying the total thickness of the first Cr layer and the layer of a second metallic compound as well as the thickness ratio of the first Cr layer to the layer of a second metallic compound within the above-mentioned range of each layer, it is possible to control the reflectivity of the recording material (reflectivity of the side from which recording by laser beam irradiation is effected) within the range of 20 to 50%. An advantage arising from such control of the reflectivity resides in that the design of an apparatus to be employed for information recording is facilitated since recording characteristics of the recording material can be varied to some extent so that they can match with characteristics of the recording apparatus.

In the meantime, in the case where the layer of a second metallic compound is provided in combination with the first Cr layer for attaining a further improvement in sensitivity, the number of each of the first Cr layer and the layer of a second metallic compound is not limited to one; that is, two or more of these layers may be employed so long as the total thickness of each Cr layer and the total thickness of each layer of a second metallic compound respectively falls within the range as specified above. When one first Cr layer and two layers of a second metallic compound are employed, they may be so arranged that the first Cr layer is sandwiched between the two layers of a second metallic compound. When two first Cr layers and one layer of a second metallic compound are employed, they may be so arranged that the layer of a second metallic compound is sandwiched between the two first Cr layers. When two or more Cr layers and two or more layers of a second metallic compound are employed, they may be so arranged that the Cr layers and the layers of a second metallic compound are alternately laminated.

The first Cr layer may be formed by means of a conventional film-forming technique, for example, vacuum evaporation-deposition, sputtering, ion-plating, electroplating, electroless plating or plasma deposition. As the method for forming the Cr layer, the vacuum evaporation-deposition technique is preferred because it is not only simple in operation but also excellent in reproducibility.

The layer of a second metallic compound to be provided in combination with the first Cr layer may be formed by means of such film-forming techniques as vacuum evaporation-deposition, sputtering, ion-plating or plasma deposition. In the case where the vacuum evaporation-deposition method is employed, a layer of a second metallic compound may be formed by deposition of a metallic compound itself according to film-forming techniques such as electric resistance heating evaporation-deposition or electron beam evaporation-deposition, or, alternatively, may be formed by using a metal capable of forming an intended second metallic compound while causing a reaction between the metal and the atmosphere in a bell jar to form a film of a second metallic compound. When using a metal oxide as the material for this layer, during the course of film formation by means of, for example, electron beam deposition under high vacuum, a suboxide may occasionally be contained in the resulting layer. However, the presence of such suboxide is permissible so long as it presents substantially no problems for the purposes of the present invention.

The metallic recording layer used in the information recording material of the present invention is composed mainly of Bi. With respect to the Bi content of the metallic recording layer, too small of a content of Bi in the metallic recording layer leads to lowering in sensitivity as well as C/N ratio due to the occurrence of disorders in shape of pits, while too large a Bi content of the metallic recording layer leads to occurrence of disorders in shape of pits and lowering in archivability of the recording material. For these reasons, the content of Bi in the metallic recording layer may preferably be in the range of 50 to 84% in number of atoms, more preferably 60 to 74% in number of atoms.

In the present invention, the metallic recording layer composed mainly of Bi may preferably contain Sb. When Bi and Sb are employed in combination in the metallic recording layer, they may be included in the metallic recording layer in either form of a single layer structure of a Bi-Sb alloy or of a double-layer structure of a layer of Bi and a layer of Sb. The provision of such Bi-Sb-composed recording layer in combination with the Cr layer gives extremely excellent results in respect of sensitivity and shape of pits formed upon laser beam irradiation. Where the content of Sb in the metallic recording layer is too small, Sb cannot exert a desirable effect on the shape of pits formed upon laser beam irradiation. On the other hand, where the content of Sb in the metallic recording layer is too large, sensitivity of the information recording material is unfavorably lowered due to the increase in melting point of the metallic recording layer. The suitable amount of Sb in the metallic recording layer is 16 to 30%, preferably 18 to 25% in number of atoms.

In order to further suppress the occurrence of disorders in shape of pits formed upon the laser beam irradiation and, at the same time, increase the sensitivity of the recording material, it is more preferred that one or more other elements than Sb and Bi be further incorporated into the metallic recording layer. Such elements include, for example, Sn, Zn, In, Pb, Mg, Au, Ge, Tl, Cd, As, Rh, Mn, Al, Se and Te. Of these elements, a particularly preferred element is Sn. The above-mentioned elements may be used alone or in combination. The content of such element may be varied, depending upon the content of Sb, within the range of 1 to 34% in number of atoms.

The metallic recording layer may contain small amounts of oxides such as a suboxide of the metal used therein in so far as such oxides do not spoil the properties required of the metallic recording layer.

The metallic recording layer of the present information recording material may be formed by means of a conventional film-forming technique, for example, vacuum evaporation-deposition, sputtering, ion-plating, electroplating, electroless plating or plasma deposition.

As the method for forming the metallic recording layer, the vacuum evaporation-deposition technique is preferred because it is not only simple in operation but also excellent in reproducibility. In order to obtain an information recording material having not only a high sensitivity but also an excellent storage stability and archivability even at high temperatures and high humidities, it is desirable to effect the evaporation-deposition under high vacuum, for example, under a pressure of $10^{-5}$ Torr or less.

In the case of the metallic recording layer comprising Bi and Sb or comprising Bi, Sb and the above-mentioned other elements than Bi and Sb, the xetallic recording layer may be in any form of a single layer structure of an alloy of two or more different metals, a multi-layer structure of respective layers of different metals, or a multi-layer structure of a layer of a single metal and a layer of an alloy, or the like. In the metallic recording layer as mentioned above, the total amount of Sb in metallic recording layer should be within the range of 16 to 30% in number of atoms and the total amount of Bi in the metallic recording layer should be within the range of 50 to 84% in number of atoms.

The thickness of the metallic recording layer may be varied according to the use of the information recording material, but is preferably in the range of about 100 to 5,000 Å, more preferably 150 to 400 Å.

In order to obtain a recording material capable of providing excellent and regular profiles of pits upon irradiation with a laser beam, in forming a recording layer, it is advantageous to deposit several different kinds of metals in separate layers, followed by forming an alloy of these metals.

In the information recording material of the present invention, there is provided a stabilizing layer 4 of a first metallic compound, as is illustrated in FIGS. 1 to 5. The stabilizing layer serves to improve the stability of the metallic recording layer against deterioration by oxidation and the like. In this respect, it is required that the stabilizing layer remain unablated after recording is completed.

Preferred examples of a metallic compound to be employed in the stabilizing layer of a first metallic compound include oxides, nitrides and fluorides of metals such as Bi, Li, B, Mg, Al, Si, Ca, Sc, Ti, V, Cr, Mn, Fe, Co, Ni, Cu, Zn, Ga, Ge, As, Sr, Y, Zr, Nb, Tc, Ru, Rh, Ag, In, Sn, Sb, Ba, La, Hf, Ta, Re, Ir, Tl, Pb, Bi, Ce, Dy, Er, Gd, Nd, Pr, Sm, Pm, Eu, Tb, Ho, Tm, Yb and Lu. Where the stabilizing layer of a first metallic compound, at its portions corresponding to the irradiated portions in the metallic recording layer, remains in a raised form, it is preferred that the shapes of all the raised portions in the stabilizing layer of a first metallic compound be substantially the same. In this respect, it is more preferred that oxides of metals such as Si, Al, Ge, Zr, Ta, Bi, Li, Mg, Ti, La, Ce, Y, Dy, Er, Gd, Hf, Sm, Cr, Nd, Pr, Pm, Eu, Tb, Ho, Tm, Yb and Lu be employed as a metallic compound for the stabilizing layer of a first metallic compound. Further more preferred are oxides of metals such as Si, Al, Ge, Zn, Bi, Mg, Ti, La, Ce, Y, Dy, Er, Gd, Hf, Sm, Cr, Nd and Pr. Most preferred are oxides of metals such as La, Ce, Y, Dy, Er, Gd, Sm, Nd and Pr.

As mentioned before, when recording is effected by laser beam irradiation from the side remote from the substrate, the second Cr layer may be provided either between the metallic recording layer and the stabilizing layer or on the side of the stabilizing layer remote from the substrate so that a further improvement in sensitivity can be attained due to the reduction in reflectivity. In this case, from a viewpoint of the degree of reduction in reflectivity produced by the combined action of the stabilizing layer of a first metallic compound and the second Cr layer, it is desirable to employ oxides of rare earth elements such as La, Ce, Y, Dy, Er, Gd, Sm, Nd, and Pr as the metallic compound for the stabilizing layer of a first metallic compound. The reason for the fact that the use of the oxides of such rare earth elements as mentioned above for the stabilizing layer of a first metallic compound gives better results in respect of reduction in reflectivity has not yet been elucidated.

However, as previously stated referring to the first Cr layer and the layer of a second metallic compound, it is believed that during the course of preparation of a recording material, a partial oxidation of Cr and a partial reduction of the oxide of a rare earth element are simultaneously caused to occur, thereby enabling the resulting laminate to have such a high refractive index as will attain a sufficient reduction in reflectivity. In addition, as previously stated referring to the first Cr layer and the layer of a second metallic compound, since the oxides of the above-mentioned rare earth elements have excellent thermal stabilities and hardly undergo deterioration, when a film of such an oxide is provided in combination with the stable film of Cr to form a laminate, the resulting laminate has a remarkably excellent stability. Further, the laminate of a film of Cr and a film of the oxide of the above-mentioned rare earth element can exhibit a remarkable stability to a light having strong energy and a short wavelength, e.g. an ultraviolet light.

The second Cr layer may be formed by the same method as employed for the preparation of the first Cr layer.

The range of thickness of the second Cr layer may be the same as that of the first Cr layer.

The stabilizing layer of a first metallic compound can be formed by a thin film-forming technique such as vacuum evaporation-deposition, sputtering, ion-plating or plasma deposition. The stabilizing layer of a first metallic compound can also be formed by reactive sputtering in which air, oxygen or an oxygen-argon mixture is introduced into the sputtering atmosphere and a plurality of targets containing different single metals or a target containing two or more kinds of metals is used.

Depending upon the kind of thin film-forming technique employed, a suboxide corresponding to the metal oxide may occasionally be formed in the stabilizing layer, if a metal oxide(s) is used for the stabilizing layer, in the course of the thin film formation. The presence of such suboxide is permissible so long as it presents substantially no problems for the purposes of the present invention. However, in order to prevent such formation of suboxide during the deposition of the stabilizing layer of a metal oxide, the deposition may advantageously be conducted in a low-vacuum atmosphere into which a gas such as oxygen, air or an oxygen-argon mixture is leaking.

The thickness of the stabilizing layer of a first metallic compound may be varied depending on the kind of compound employed. However, if the stabilizing layer of a first metallic compound is too thick, cracks are apt to occur in the stabilizing layer of a first metallic compound. On the other hand, if the stabilizing layer of a first metallic compound is too small in thickness, it easily undergoes rupture at the time of formation of pits in the metallic recording layer. For these reasons, it is preferred that the thickness of the stabilizing layer be 10 to 10000 Å, more preferably 20 to 300 Å.

In the meantime, in the case where the second Cr layer is provided in combination with the stabilizing layer of a first metallic compound for attaining a further improvement in sensitivity, the number of each of the second Cr layer and the stabilizing layer of first metallic compound is not limited to one; that is, two or more of these layers may be employed so long as the total thickness of each Cr layer and the total thickness of each stabilizing layer of a first metallic compound respectively falls within the range as specified above. When one second Cr layer and two stabilizing layers of a first metallic compound are employed, they may be so arranged that the second Cr layer is sandwiched between the two stabilizing layers of a first metallic compound. When two second Cr layers and one stabilizing layer of a first metallic compound are employed, they may be so arranged that said stabilizing layer of a first metallic compound is sandwiched between the two second Cr layers. When two or more Cr layers and two or more stabilizing layers of a first metallic compound are employed, they may be so arranged that the Cr layers and the stabilizing layers of a first metallic compound are alternatively laminated.

According to the present invention, by varying the total thickness of the second Cr layer and the stabilizing layer of a first metallic compound as well as the thickness ratio of the second Cr layer to the stabilizing layer of a first metallic compound within the above-mentioned range of each layer, it is possible to control the reflectivity of the recording material (reflectivity of the side from which recording by laser beam irradiation is effected) within the range of 10 to 50%. An advantage arising from such control of the reflectivity resides in, as previously stated referring to the first Cr layer and the layer of a second metallic compound, the ease in design of an information recording apparatus.

The information recording material of the present invention may further comprise a transparent uppermost protective layer. This transparent protective layer serves to protect the information recording material against a mechanical damage.

The transparent protective layer to be used in the present recording material may comprise an organic polymer either as the main component or as the sole component.

As examples of organic polymers that may be used in the transparent protective layer, there can be mentioned polyvinylidene chloride, copolymers of vinylidene chloride and acrylonitrile, polyvinyl acetate, polyimides, polyvinyl cinnamate, polyisoprene, polybutadiene, polystyrene, polymethyl methacrylate, polyurethanes, polyvinyl butyral, fluororubbers, polyamides, polyesters, epoxy resins, cellulose acetate and terpolymers of vinyl acetate-vinyl butyral-vinyl alcohol; modified polymers thereof; and copolymers of monomer units of the above polymers. They may be used either alone or in mixture. Polyesters, fluororubbers and terpolymers of vinyl acetate-vinyl butyral-vinyl alcohol are especially preferred.

A silicone oil, an antistatic agent, and a crosslinking agent for improving film strength and antistatic properties may be added to the organic polymer for the transparent protective layer. If desired, the transparent protective layer may be of a multi-layer structure.

The transparent protective layer can be formed by coating a coating composition containing an organic polymer dissolved in a suitable solvent, or by laminating a thin film of an organic polymer. The thickness of the transparent protective layer is preferably in the range of 0.1 to 10 $\mu$.

As mentioned hereinabove, the information recording material of the present invention is extremely excellent in C/N ratio as well as in storage stability and archivability.

PREFERRED EMBODIMENTS

The following Examples illustrate the present invention in more detail but should not be construed as limiting the scope of the invention.

In the following Examples, the sensitivities of each of information recording materials was evaluated in terms of the threshold intensity and the practical recording intensity. The "threshold intensity" as used herein is intended to mean the minimum intensity of a laser beam capable of producing a pit in the recording layer of an information recording material. The "practical recording intensity" as used herein is intended to mean such an intensity of a laser beam to be employed at the time of effecting information recording as is of a level to render the pulse width of the readout signals to be obtained in the readout operation equal to the pulse width of the laser beam employed in effecting the information recording. In the following Examples, such pratical recording intensity was examined as follows. A semiconductor laser beam modulated to have a pulse width of 500 nsec was applied to the metallic recording layer of the information recording material being rotated at 450 rpm to effect recording. In effecting the recording, there were employed laser beams having intensities varied from the threshold intensity values to about 15 mW. Subsequently, readout of the recorded information was effected using a semiconductor laser beam having an intensity of 1 mW. The relationship between the laser beam intensity used at the time of information recording and the pulse width of signals obtained at the time of readout was examined. From the above relationship, a laser beam intensity at the time of recording required to obtain readout signals having a pulse width of 500 nsec was determined. The thus determined laser beam intensity is the so-called practical recording intensity, which is optimum in the information recording operation.

EXAMPLE 1 AND COMPARATIVE EXAMPLES 1 AND 2

A smooth surface-having polymethyl methacrylate (hereinafter referred to as "PMMA") plate having a thickness of 1.2 mm prepared by casting was machined into a disk of 30 cm in diameter. The disk was so set in a vacuum deposition equipment that the disk could be rotated in the central portion of the equipment. The equipment included three heating vaporization boats and an electron beam vacuum evaporation apparatus having five crucibles.

Bi, Sb and Cr were separately put in the heating vaporization boats, and Si and $Sm_2O_3$ were separately put in two of the crucibles of the electron beam vacuum evaporation apparatus. The equipment was pumped down to a vacuum of $2 \times 10^{-6}$ Torr and the disk was rotated at 120 rpm.

A 70 Å thick film of Cr was firstly deposited on the disk. Subsequently, Sb and Bi were deposited in sequence thereon to form a 300 Å thick metallic recording layer of Bi containing Sb in an amount of 20% in number of atoms. Then, a 200 Å-thick film of $Sm_2O_3$ was deposited on the metallic recording layer to form a stabilizing layer, whereby Recording Material A was obtained.

Recording Material B was prepared in substantially the same manner as in Recording Material A except that the Cr layer was not provided.

Recording Material C was prepared in substantially the same manner as in Recording Material A except that a 70 Å-thick Si layer was provided between the substrate and the metallic recording layer instead of the Cr layer.

The thickness of a film or layer being deposition-formed on the disk was monitored by means of a quartz oscillator, and controlled automatically in the order of the materials to be deposited in sequence in accordance with a program. No intentional heating of disk was conducted during the vacuum evaporation, and substantially no increase in temperature of the disk was observed.

The evaluation of the recording characteristics of each of the resulting recording materials was conducted as follows.

A semiconductor laser beam (oscillation wavelength: 840 nm) modulated to have a pulse width of 500 nsec (frequency: 1 MHz) was concentrated to about 1 μin beam diameter by means of a lens (numerical aperture: 0.5) and applied to the metallic recording layer of the so prepared recording disk being rotated at 450 rpm to effect recording while moving a pickup head of a laser beam irradiation apparatus slowly in a radial direction of the disk. The irradiation with the semiconductor laser beam was effected from the side of the substrate. As a result, pits (holes) were formed in the irradiated areas in the metallic recording layer. The pits were arranged spirally in the disk. A semiconductor laser beam being continuously emitted and having such an intensity as will not produce a pit (approximately 1 mW) was subsequently applied to the recording material while auto-focussing and auto-tracking the condensed laser beam on the recording disk and the variation of the reflected light was detected by means of a photosensor. The obtained electric signals were then inputted into a spectrum analyzer to examine a noise level and a carrier peak level. A C/N ratio of each recording material was calculated from the noise level and the carrier peak level thus obtained. At the same time, the reflectivity of each recording material was examined at the side from which the laser beam was applied. Further, the "threshold intensity" and the "practical recording intensity" of the semiconductor laser beam employed for the information recording were determined. The threshold intensity will hereinafter be abbreviated as "Pth" and the practical recording intensity will hereinafter be abbreviated as "Pv".

The results obtained are shown in Table 1.

TABLE 1

| Example No. | Recording Material | Reflectivity λ = 830 nm (%) | C/N ratio (dB) | Pth (mW) | Pv (mW) |
| --- | --- | --- | --- | --- | --- |
| Example 1 | A | 53 | 49 | 5 | 7.2 |
| Comparative Example 1 | B | 58 | 35 | 6 | 8.5 |
| Comparative Example 2 | C | 55 | 40 | 6 | 8.0 |

The shape of pits formed in the metallic recording layer of each recording material was examined by means of an electron microscope. The pits formed in the recording layer of Recording Material A were free from disorders. However, the pits formed in the recording layer of each of Recording Material B and Recording Material C had disordered edge line and, in addition, varied widely in size.

It is apparent from the above that the presence of the Cr layer greatly contributes to an increase in C/N ratio.

EXAMPLE 2 AND COMPARATIVE EXAMPLE 3

Bi, Sn and Sb were separately put in three heating vaporization boats, and Cr, Al and Al$_2$O$_3$ were separately put in three of the crucibles of the electron beam vacuum evaporation apparatus in the same vacuum deposition equipment as used in Example 1.

The equipment was pumped down to a vacuum of $2 \times 10^{-6}$ Torr and a disk made of PMMA was rotated at 120 rpm. Cr was firstly deposited on the disk to form a Cr layer having a thickness of 60 Å.

Subsequently, Bi, Sn and Sb were deposited in sequence on the Cr layer to form a 300 Å-thick metallic recording layer containing Sb and Bi in amounts of 18% and 70% in the number of atoms, respectively. Finally, a 150 Å-thick film of Al$_2$O$_3$ was deposited on the metallic recording layer to form a stabilizing layer, whereby Recording Material D was obtained.

Recording Material E was obtained in substantially the same manner as in Recording Material D except that a 60 Å-thick Al layer was provided between the substrate and the metallic recording layer instead of the Cr layer.

Recording characteristics of the thus obtained recording materials were evaluated in the same manner as described in Example 1. The results obtained are shown in Table 2.

TABLE 2

| Example No. | Recording Material | Reflectivity λ = 830 nm (%) | C/N ratio (dB) | Pth (mW) | Pv (mW) |
| --- | --- | --- | --- | --- | --- |
| Example 2 | D | 53 | 48 | 5 | 7.0 |
| Comparative Example 3 | E | 58 | 38 | 6.5 | 8.5 |

The examination by means of an electron microscope showed that the pits formed in the recording layer of Recording Material D were free from disorders in shape, while the pits formed in the recording layer of Recording Material E had a disordered edge line.

EXAMPLE 3 AND 4 AND COMPARATIVE EXAMPLE 4

Bi, Sb and Cr were separately put in three heating vaporization boats, and La$_2$O$_3$ and Al$_2$O$_3$ were separately put in two of the crucibles of the electron beam vacuum evaporation apparatus in the same vacuum deposition equipment as used in Example 1.

The equipment was pumped down to a vacuum of $2 \times 10^{-6}$ Torr and a disk made of PMMA was rotated at 120 rpm. Cr was firstly deposited on the disk to form a Cr layer having a thickness of 70 Å. Then, a 60 Å-thick La$_2$O$_3$ film was deposition-formed on the Cr layer. On the so-formed La$_2$O$_3$ layer, Bi and Sb were deposited in sequence to form a 300 Å-thick metallic recording layer of Bi containing Sb in an amount of 18% in number of atoms. Finally, a 200 Å-thick film of La$_2$O$_3$ was deposition-formed on the metallic recording layer to form a stabilizing layer, whereby Recording Material F was obtained.

Recording Material G was prepared in substantially the same manner as in Recording Material F except that a 60 Å-thick $Al_2O_3$ layer was formed between the Cr layer and the metallic recording layer instead of the $La_2O_3$ layer.

Recording Material H was prepared in substantially the same manner as in Recording Material F except that a 70 Å-thick Ti layer was formed on the disk instead of the Cr layer.

Recording characteristics of the thus obtained recording materials were evaluated in the same manner as described in Example 1. The results obtained are shown in Table 3.

TABLE 3

| Example No. | Recording Material | Reflectivity $\lambda$ = 830 nm (%) | C/N ratio (dB) | Pth (mW) | Pv (mW) |
| --- | --- | --- | --- | --- | --- |
| Example 3 | F | 40 | 50 | 3.5 | 5.5 |
| Example 4 | G | 53 | 48 | 5 | 7.8 |
| Comparative Example 4 | H | 52 | 44 | 5 | 7.5 |

The examination by means of an electron microscope showed that the pits formed in the recording layer of each of Recording Materials F and G were free from disorders in shape, while the pits formed in the recording layer of Recording Material H had a somewhat disordered edge line.

From the above, it can be confirmed that the provision of the Cr layer between the substrate and the metallic recording layer contributes to an increase in C/N ratio and, that the provision of the layer of an oxide of a rare earth element at a position adjacent to the Cr layer contributes to reduction in reflectivity of the recording material.

EXAMPLE 5

Bi, Sb and Cr were separately put in three heating vaporization boats, and $La_2O_3$ was put in one of the crucibles of the electron beam vacuum evaporation apparatus in the same vacuum deposition equipment as used in Example 1.

The equipment was pumped down to a vacuum of $2 \times 10^{-6}$ Torr and a disk made of PMMA was rotated at 120 rpm. $La_2O_3$ was firstly deposited on the disk to form a layer of 60 Å in thickness. Then, a 70 Å-thick Cr film was deposition-formed on the $La_2O_3$ layer. On the so-formed Cr layer, Bi and Sb were deposited in sequence to form a 300 Å-thick metallic recording layer of Bi containing Sb in an amount of 18% in number of atoms. Finally, a 200 Å-thick film of $La_2O_3$ was deposition-formed on the metallic recording layer to form a stabilizing layer, whereby Recording Material I was obtained.

Recording characteristics of the thus obtained Recording Material I were evaluated in the same manner as described in Example 1. The results obtained are shown in Table 4.

TABLE 4

| Example No. | Recording Material | Reflectivity $\lambda$ = 830 nm (%) | C/N ratio (dB) | Pth (mW) | Pv (mW) |
| --- | --- | --- | --- | --- | --- |
| Example 5 | I | 42 | 49 | 3.7 | 5.8 |

From the above, it can be confirmed that the provision of a layer of an oxide of a rare earth element at a position adjacent to the Cr layer contributes to a reduction in reflectivity which brings about an improvement in sensitivity of the recording material.

EXAMPLES 6 AND 7 AND COMPARATIVE EXAMPLES 5 AND 6

Bi, Sb and Cr were separately put in three heating vaporization boats, and $Sm_2O_3$ was put in one of the crucibles of the electron beam vacuum evaporation apparatus in the same vacuum deposition equipment as used in Example 1.

The equipment was pumped down to a vacuum of $2 \times 10^{-6}$ Torr and a disk made of PMMA was rotated at 120 rpm.

Cr was firstly deposited on the disk to form a layer of 65 Å in thickness. Then, a 70 Å-thick $Sm_2O_3$ film was deposition-formed on the Cr layer. On the so-formed $Sm_2O_3$ layer, Sb and Bi were deposited in sequence to form a 250 Å-thick metallic recording layer of Bi containing Sb in an amount of 20% in number of atoms. Finally, a 200 Å-thick film of $Sm_2O_3$ was deposition-formed on the metallic recording layer to form a stabilizing layer, whereby Recording Material J was obtained.

Recording Materials K, L and M were prepared in substantially the same manner as described above except that the content of Sb in the metallic recording layer was changed to 24%, 10% and 35%, respectively in number of atoms.

Recording characteristics of the resulting recording materials were evaluated in the same manner as described in Example 1. The results obtained are shown in Table 5.

TABLE 5

| Example No. | Recording Material | Reflectivity $\lambda$ = 830 nm (%) | C/N ratio (dB) | Pth (mW) | Pv (mW) |
| --- | --- | --- | --- | --- | --- |
| Example 6 | J | 40 | 51 | 3.3 | 5.5 |
| Example 7 | K | 40 | 50 | 3.5 | 5.8 |
| Comparative Example 5 | L | 40 | 44 | 3.3 | 5.5 |
| Comparative Example 6 | M | 40 | 45 | 4.0 | 6.5 |

Examination by means of an electron microscope showed that the pits formed in the recording layer in Recording Materials J and K were especially excellent in shape.

From the above, it can be confirmed that the Sb content in the metallic recording layer affects both the C/N ratio and sensitivity of the recording material.

EXAMPLE 8

Bi, Sb and Sn were separately put in three heating vaporation boats, and Cr, $Sm_2O_3$ and $Al_2O_3$ were separately put in three of the crucibles of the electron beam vacuum evaporation apparatus in the same vacuum deposition equipment as used in Example 1.

The equipment was pumped down to a vacuum of $2 \times 10^{-6}$ Torr and a disk made of PMMA was rotated at 120 rpm. Cr was firstly deposited on the disk to form a layer of 75 Å in thickness. Then, a 50 Å-thick $Sm_2O_3$ film was deposition-formed on the Cr layer. On the so-formed $Sm_2O_3$ layer, Sb, Bi and Sn were deposited in sequence to form a 300 Å-thick metallic recording layer containing Sb and Bi in amounts of 18% and 70%, respectively, in number of atoms. Finally, a 200 Å-thick $Al_2O_3$ film was deposition-formed on the metallic recording layer to form a stabilizing layer, whereby Recording Material N was obtained.

Recording characteristics of the thus obtained Recording Material were evaluated in the same manner as described in Example 1. The results obtained are shown in Table 6.

TABLE 6

| Example No. | Recording Material | Reflectivity λ = 830 nm (%) | C/N ratio (dB) | Pth (mW) | Pv (mW) |
| --- | --- | --- | --- | --- | --- |
| Example 8 | N | 38 | 51 | 3.3 | 5.2 |

EXAMPLE 9

Bi and Sb were separately put in two heating vaporization boats, and Cr and $Sm_2O_3$ were separately put in two of the crucibles of the electron beam vacuum evaporation apparatus in the same vacuum deposition equipment as used in Example 1.

The equipment was pumped down to a vacuum of $2 \times 10^{-6}$ Torr and a disk made of PMMA was rotated at 120 rpm. $Sm_2O_3$ was firstly deposited on the disk to form a layer of 60 Å in thickness. Then, a 60 Å-thick Cr film was deposition-formed on the $Sm_2O_3$ layer to form a Cr layer. On the so-formed Cr layer, Sb and Bi were deposited in sequence to form a 240 Å-thick metallic recording layer of Bi containing Sb in an amount of 22% in number of atoms. Finally, a 150 Å-thick $Sm_2O_3$ film was deposition-formed on the metallic recording layer to form a stabilizing layer.

Recording characteristics of the resulting recording material were evaluated in the same manner as described in Example 1. The results obtained are shown in Table 7.

TABLE 7

| Example No. | Recording Material | Reflectivity λ = 830 nm (%) | C/N ratio (dB) | Pth (mW) | Pv (mW) |
| --- | --- | --- | --- | --- | --- |
| Example 9 | O | 45 | 52 | 3.3 | 5.8 |

EXAMPLE 10

Bi and Sb were separately put in two heating vaporization boats, and Cr and $Sm_2O_3$ were separately put in two of the crucibles of the electron beam vacuum evaporation apparatus in the same vacuum deposition equipment as used in Example 1.

The equipment was pumped down to a vacuum of $2 \times 10^{-6}$ Torr and a disk made of PMMA was rotated at 120 rpm.

Cr was firstly deposited on the disk to form a Cr layer of 70 Å in thickness. Then, Sb and Bi were deposited in sequence on the Cr layer to form a 300 Å-thick metallic recording layer of Bi containing Sb in an amount of 20% in number of atoms. On the so-obtained metallic recording layer, a 60 Å-thick $Sm_2O_3$ film was deposition-formed to obtain a stabilizing layer. Further, a 60 Å-thick Cr layer was deposition-formed on the stabilizing layer, whereby Recording Material P was obtained.

Recording characteristics of the thus obtained Recording Material P were evaluated in the same manner as described in Example 1 except that irradiation was effected from the side remote from the substrate, through a 1.2 mm-thick plate of PMMA. The 1.2 mm-thick PMMA plate was employed for the purpose of correcting aberration.

For reference, evaluation of recording characteristics of Recording Material A as prepared in Example 1 was carried out in the same manner as mentioned above. The results obtained are shown in Table 8.

TABLE 8

| Example No. | Recording Material | Reflectivity* 830 nm (%) | C/N ratio (dB) | Pth (mW) | Pv (mW) |
| --- | --- | --- | --- | --- | --- |
| 1 | A | 60 | 49 | 7.5 | 10 |
| 10 | P | 30 | 49 | 3.5 | 5 |

Note:
*reflectivity of the recording material at the side remote from the substrate As is apparant from the above, in the case where recording is effected by laser beam irradiation from the side remote from the substrate, reflectivity of the recording material can effectively be reduced by providing a Cr layer at a position adjacent to the stabilizing layer of a metallic compound.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An information recording material having a high sensitivity and C/N ratio comprising a substrate having superimposed thereon in the following order a first Cr layer having a thickness of 10 to 200 Å, a metallic recording layer composed mainly of Bi, and a stabilizing layer of a first metallic compound said relationship of thickness of said Cr layer together with said metallic recording layer composed mainly of Bi producing an information recording layer which suppresses increased noise level and has a high sensitivity and C/N ratio.

2. An information recording material according to claim 1, wherein the thickness of the first Cr layer is 30 to 80 Å.

3. An information recording material according to claim 1, which further comprises a second Cr layer provided either between said metallic recording layer and said stabilizing layer of a first metallic compound or on the side of said stabilizing layer of a first metallic compound remote from said substrate.

4. An information recording material according to claim 1, wherein said Bi metallic recording layer further includes 16 to 30% Sb.

5. An information recording material according to claim 1, wherein said stabilizing layer of a first metallic compound comprises at least one member selected from the group consisting of oxides, nitrides and fluorides of a metal selected from Be, Li, B, Mg, Al, Si, Ca, Sc, Ti, V, Cr, Mn, Fe, Co, Ni, Cu, Zn, Ga, Ge, As, Sr, Y, Zr, Nb, Tc, Ru, Rh, Ag, In, Sn, Sb, Ba, La, Hf, Ta, Re, Ir, Tl, Pb, Bi, Ce, Dy, Er, Gd, Nd, Pr, Sm, Pm, Eu, Tb, Ho, Tm, Yb and Lu.

6. An information recording material according to claim 1, wherein said stabilizing layer of a first metallic compound comprises at least one member selected from the group consisting of oxides of a metal selected from Si, Al, Ge, Zr, Ta, Bi, Li, Mg, Ti, La, Ce, Y, Dy, Er, Gd, Hf, Sm, Cr, Nd, Pr, Pm, Eu, Tb, Ho, Tm, Yb and Lu.

7. An information recording material according to claim 1, wherein said stabilizing layer of a first metallic compound comprises at least one member selected from the group consisting of oxides of a metal selected from Si, Al, Ge, Zr, Bi, Mg, Ti, La, Ce, Y, Dy, Er, Gd, Hf, Sm, Cr, Nd and Pr.

8. An information recording material according to claim 3, wherein said stabilizing layer of a first metallic compound comprises at least one member selected from the group consisting of oxides of a metal selected from La, Ce, Y, Dy, Er, Gd, Sm, Nd and Pr.

9. An information recording material according to claim 1, which further comprises a layer of a second metallic compound either between the substrate and the first Cr layer or between the first Cr layer and the metallic recording layer.

10. An information recording material according to claim 9, wherein said layer of a second metallic compound comprises at least one member selected from the group consisting of oxides, nitrides and fluorides of a metal selected from Be, Li, B, Mg, Al, Si, Ca, Sc, Ti, V, Cr, Mn, Fe, Co, Ni, Cu, Zn, Ga, Ge, As, Sr, Y, Zr, Nb, Tc, Ru, Rh, Ag, In, Sn, Sb, Ba, La, Hf, Ta, Re, Ir, Tl, Pb, Bi, Ce, Dy, Er, Gd, Nd, Pr, Sm, Pm, Eu, Tb, Ho, Tm, Yb and Lu.

11. An information recording material according to claim 9, wherein said layer of a second metallic compound comprises at least one member selected from the group consisting of oxides of a rare earth element selected from Y, La, Ce, Pr, Nd, Pm, Sm, Eu, Gd, Tb, Dy, Ho, Er, Tm, Yb and Lu.

* * * * *